United States Patent [19]

Van der Meulen et al.

[11] 4,405,570
[45] Sep. 20, 1983

[54] REMOVAL OF DISSOLVED CADMIUM AND COPPER FROM SULPHATE SOLUTION WITH HYDROGEN SULFIDE

[75] Inventors: Jack Van der Meulen; Donald R. Weir, both of Fort Saskatchewan, Canada

[73] Assignee: Sherritt Gordon Mines Limited, Toronto, Canada

[21] Appl. No.: 417,830

[22] Filed: Sep. 14, 1982

[30] Foreign Application Priority Data

Jul. 7, 1982 [CA] Canada ................................ 406794

[51] Int. Cl.³ .................... C01G 3/12; C01G 11/02
[52] U.S. Cl. .................................. 423/43; 423/101; 423/140; 423/561 R; 423/561 B
[58] Field of Search ............... 423/37, 43, 101, 140, 423/143, 561 R, 561 B

[56] References Cited

U.S. PATENT DOCUMENTS

| | | | |
|---|---|---|---|
| 1,334,720 | 3/1920 | Thompson | 423/37 |
| 2,755,172 | 7/1956 | McGauley | 423/101 |
| 2,915,388 | 12/1959 | Lyle | 423/337 |
| 3,218,161 | 11/1965 | Kunda | 423/37 |
| 3,980,752 | 9/1976 | Fekete | 423/140 |
| 4,073,860 | 2/1978 | Huggins | 423/140 |
| 4,123,499 | 10/1978 | Welsh | 423/37 |
| 4,231,993 | 11/1980 | Sandberg | 423/37 |
| 4,278,539 | 7/1981 | Santhanam | 423/101 |

FOREIGN PATENT DOCUMENTS

| | | | |
|---|---|---|---|
| 51-19438 | 6/1976 | Japan | 423/561 B |
| 579745 | 5/1978 | U.S.S.R. | 423/37 |

OTHER PUBLICATIONS

Skoog *Fundamentals of Analytical Chemistry*, Holt, Rinehart, Winston, N.Y. (1963) pp. 747 748.
Hillebrand, *Applied Inorganic Analysis*, 2nd Ed., John Wiley & Sons, N.Y. (1953) pp. 58–61.

*Primary Examiner*—Brian E. Hearn
*Attorney, Agent, or Firm*—Robert F. Delbridge; Arne I. Fors

[57] ABSTRACT

A process for selectively removing ions of copper and/or cadmium from a sulphate solution containing nickel and/or cobalt values. The solution is treated at a temperature in the range of from about 85° to about 95° C. and at a pH in the range of from about 4.5 to about 5.5 with hydrogen sulphide to precipitate copper and/or cadmium ions as copper and/or cadmium sulphide, and the precipitated copper and/or cadmium sulphide is separated from the solution.

9 Claims, 1 Drawing Figure

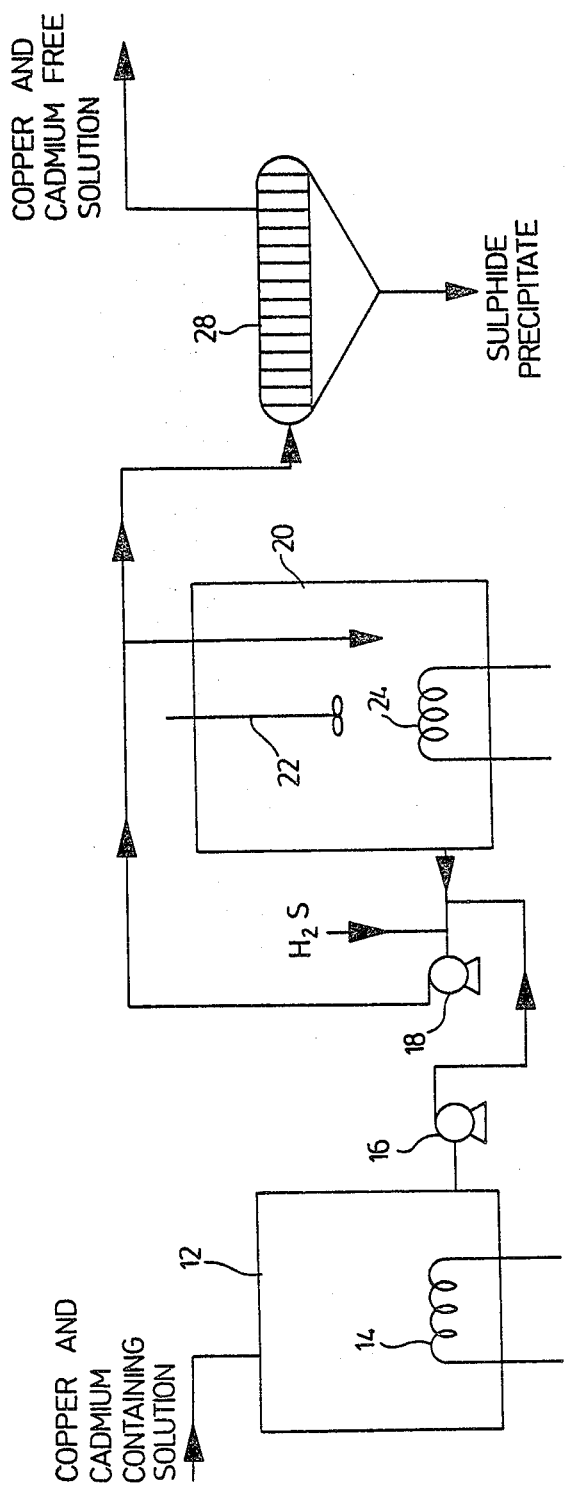

REMOVAL OF DISSOLVED CADMIUM AND COPPER FROM SULPHATE SOLUTION WITH HYDROGEN SULFIDE

This invention relates to the selective removal of dissolved copper and cadmium from sulphate solutions also containing dissolved nickel and/or cobalt.

It is known to recover nickel and/or cobalt from nickel and/or cobalt containing materials by processes which include the production of a sulphate solution containing dissolved nickel and/or cobalt from which nickel and/or cobalt is recovered. Such material usually also contains other elements, such as iron, which may be present in undesirable quantities in the sulphate solution from which nickel and/or cobalt is to be recovered, and thus it is usually necessary to subject the sulphate solution to one or more purification steps before nickel and/or cobalt is recovered therefrom.

Also, it is known that nickel and cobalt can be precipitated from sulphate solutions thereof by treatment with hydrogen sulphide at low pH, namely pH less than about 3.5. Typical processes of this kind are described for example in U.S. Pat. No. 2,722,480 issued Nov. 1, 1955 to Roy and U.S. Pat. No. 2,726,953 issued Dec. 13, 1955 to Roy et al.

Some nickel and/or cobalt containing materials also contain significant amounts of copper and cadmium, and it has been found that, as a result of conventional treatment of such material, the nickel and/or cobalt sulphate solution also contains an undesirably high amount of dissolved copper and cadmium which contaminates the subsequent nickel and/or cobalt product to an undesirable degree.

It is therefore an object of the invention to provide a process for selectively removing copper and cadmium ions from a sulphate solution containing nickel and/or cobalt values.

According to the invention, it has been found that copper and cadmium ions can be selectively precipitated from a sulphate solution containing nickel and/or cobalt values by treating the solution at a temperature in the range of from about 85° to about 95° C. and at a pH in the range of from about 4.5 to about 5.5 with hydrogen sulphide. The copper and cadmium ions are precipitated as sulphides which can subsequently be separated from the solution.

The process according to the present invention enables the copper and cadmium ion concentration to be reduced to satisfactory low values without concurrently precipitating any significant amounts of nickel and/or cobalt even though the nickel and/or cobalt concentrations are much higher than the copper and cadmium concentrations. For example, the initial sulphate solution may contain from about 0.1 to about 2 g/L copper, from about 0.05 to about 0.5 g/L cadmium, from about 40 to about 50 g/L nickel and/or from about 20 to about 50 g/L cobalt.

The hydrogen sulphide treatment may reduce the copper ion concentration to less than about 0.001 g/L and the cadmium ion concentration to less than about 0.01 g/L.

The sulphate solution and hydrogen sulphide gas may conveniently be fed to the intake of a pump so that the sulphate solution and hydrogen sulphide gas are adequately mixed by operation of the pump, passing at least part of the resultant mixture into a reaction tank, agitating the mixture in the tank and removing the resultant slurry from the tank for separation of the precipitated sulphides from the solution. Advantageously, slurry from the reaction tank may also be fed to the intake of the pump to ensure adequate mixing of the sulphate solution and the hydrogen sulphide gas with the slurry. Part of the resultant mixture is passed into the reaction tank and part is removed from separation of the precipitated sulphides.

One embodiment of the invention will now be described, by way of example, with reference to the accompanying drawing which shows a flow diagram of a process for removing copper and cadmium ions from a sulphate solution containing nickel and cobalt values.

Referring to the drawing, a process in accordance with the invention is used to remove copper and cadmium ions from a nickel and cobalt containing sulphate solution which has been produced in a hydrometallurgical process in which nickel and cobalt containing sulphidic material is leached in known manner, the leach solution subsequently being separated from the leach residue and subjected to an iron removal step and any other necessary purification steps in known manner. Such a solution will typically contain from about 40 to about 50 g/L nickel, from about 20 to about 50 g/L cobalt, from about 0.1 to about 2 g/L copper, from about 0.05 to about 0.5 g/L cadmium, from about 5 to about 30 g/L zinc and less than about 0.01 g/L iron. The purification steps are conducted in such a manner that the purified sulphate solution has a pH of 4.5 to 5.5.

The solution is stored in a storage tank 12 provided with a steam heating coil 14 to maintain the solution at a temperature of about 85° to 95° C. The solution is pumped from the storage tank 12 by a variable flow pump 16 to the intake of a circulating pump 18 in a circulating circuit associated with a copper and cadmium removal tank 20. In the circulating circuit, slurry passes from an outlet from the bottom of the tank 20 on one side thereof to the intake of the circulating pump 18 which, as mentioned, also receives a fresh solution from the storage tank 12. Hydrogen sulphide gas is also supplied to the intake of the circulating pump 18. The resultant mixture is partly returned to the tank 20 and partly passed to a pressure filter 28. The tank 20 is provided with an agitator 22 to maintain the contents in an adequately mixed state and a steam heating coil 24 to maintain the contents at the desired temperature.

Thus, hydrogen sulphide gas is thoroughly mixed with solution from the storage tank 12 and with slurry from the copper and cadmium removal tank 20 by the circulating pump 18, with such mixing being maintained in the tank 20 by the agitator 22 such that the hydrogen sulphide causes the precipitation of substantially all of the dissolved cadmium and copper with some of the dissolved zinc as sulphides, but with substantially no dissolved nickel or cobalt being precipitated. The supply of hydrogen sulphide is such that a stoichiometric excess of hydrogen sulphide relative to the dissolved cadmium and copper is maintained in the slurry, the molar ratio of hydrogen sulphide and copper preferably being greater than 10.

In the pressure filter 28, the precipitated cadmium, copper and zinc sulphides are separated from the remaining nickel and cobalt sulphate solution which is subsequently treated in known manner for recovery of nickel and cobalt.

In a specific example of the previously described embodiment, the solution in the storage tank 12 has a pH of 4.5 to 5.5, it being difficult to determine the precise pH value in view of the high ionic strength of the solution and its temperature, the temperature being maintained at about 90° C. The solution was pumped by pump 16 to the intake of pump 18 at an average flow rate of 74 L/min. H₂S gas was supplied to the intake of pump 18 at a rate of 89 L/min to provide a molar ratio of hydrogen sulphide to dissolved cadmium and copper of 12.6.

The reaction tank 20 has a volume of 22,700 liters, and the circulating pump 18 operates to circulate the mixture at a rate of 365 to 455 L/min. The pressure filter 28 was a Sweetland filter with 18 circular filter leafs having a filtration area of about 24 m².

The slurry in the storage tank 12 and the slurry leaving the pressure filter 28 analyzed as shown in the following table, with percentage precipitation also being shown:

TABLE 1

| Flow | Solution Analysis (g/L) | | | | | Precipitation (%) | | | | |
|------|------|------|------|------|------|------|------|------|------|------|
|      | Ni | Co | Cu | Cd | Zn | Ni | Co | Cu | Cd | Zn |
| In   | 42.93 | 40.23 | 0.187 | 0.164 | 18.98 | 0.07 | 0.08 | >99 | 93.8 | 17.8 |
| Out  | 42.90 | 40.20 | <0.001 | 0.01 | 15.6 |  |  |  |  |  |

The sulphide cake recovered from the filter 28 analyzed as follows (percent dry basis): 0.55 nickel, 0.16 cobalt, 1.56 copper, 1.57 cadmium and 45.1 zinc.

Thus, over 90% of the copper and cadmium in the solution is removed, with less than 0.1% of the nickel and cobalt being removed despite the high nickel and cobalt concentrations.

Other embodiments and examples of the invention will be readily apparent to a person skilled in the art, the scope of the invention being defined in the appended claims.

What we claim as new and desire to protect by Letters Patent of the United States is:

1. A process for selectively removing ions of at least one impurity metal selected from the group consisting of copper and cadmium from a sulphate solution containing nickel and/or cobalt values, comprising treating the solution at a temperature in the range of from about 85° to about 95° C. and at a pH in the range of from about 4.5 to about 5.5 with hydrogen sulphide to precipitate impurity metal ions as metal sulphide and separating the precipitated metal sulphide from the solution.

2. A process according to claim 1 wherein the initial solution contains from about 0.1 to about 2 g/L copper, from about 40 to about 50 g/L nickel and/or from about 20 to about 50 g/L cobalt.

3. A process according to claim 2 wherein the hydrogen sulphide treatment is carried out to reduce the copper ion concentration to less than about 0.001 g/L.

4. A process according to claim 1 wherein the initial solution contains from about 0.05 to about 0.5 g/L cadmium, from about 40 to about 50 g/L nickel and/or from about 20 to about 50 g/L cobalt.

5. A process according to claim 4 wherein the hydrogen sulphide treatment is carried out to reduce the cadmium ion concentration to less than about 0.01 g/L.

6. A process according to claim 1 comprising feeding the sulphate solution and hydrogen sulphide gas to the intake of a pump to cause the sulphate solution and hydrogen sulphide gas to be adequately mixed by operation of the pump, passing at least part of the resultant mixture into a reaction tank, agitating the mixture in the tank, and removing the resultant slurry from the tank for separation of the precipitated impurity metal sulphide from the solution.

7. A process according to claim 6 wherein slurry from the reaction tank is also fed to the intake of the pump.

8. A process according to claim 7 wherein part of the resultant mixture is passed into the reaction tank and part is removed from separation of the precipitated sulphides.

9. A process for selectively removing copper and cadmium ions from nickel and cobalt sulphate solution containing from about 0.1 to about 2 g/L copper, from about 0.05 to about 0.5 g/L cadmium, from about 40 to about 50 g/L nickel and from about 20 to about 50 g/L cobalt, comprising treating the solution at a temperature in the range of from about 85° to about 95° C., and at a pH in the range of from about 4.5 to about 5.5 with hydrogen sulphide to precipitate copper and cadmium sulphides, and removing the precipitated sulphides from the solution.

* * * * *